(12) United States Patent
Abe et al.

(10) Patent No.: US 12,456,878 B2
(45) Date of Patent: Oct. 28, 2025

(54) ELECTRONIC APPARATUS, CONTROL METHOD, AND STORAGE MEDIUM

(71) Applicant: CANON KABUSHIKI KAISHA, Tokyo (JP)

(72) Inventors: Takamitsu Abe, Tokyo (JP); Yuki Chishima, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 65 days.

(21) Appl. No.: 18/625,524

(22) Filed: Apr. 3, 2024

(65) Prior Publication Data

US 2024/0348073 A1 Oct. 17, 2024

(30) Foreign Application Priority Data

Apr. 13, 2023 (JP) ................................. 2023-065898

(51) Int. Cl.
*H02J 7/00* (2006.01)

(52) U.S. Cl.
CPC .......... *H02J 7/0063* (2013.01); *H02J 2207/20* (2020.01); *H02J 2207/30* (2020.01)

(58) Field of Classification Search
CPC .. H02J 7/0063; H02J 2207/30; H02J 2207/20; H04N 23/65
See application file for complete search history.

(56) References Cited

U.S. PATENT DOCUMENTS

| | | | | |
|---|---|---|---|---|
| 6,864,669 B1 * | 3/2005 | Bucur | ................... | H02J 7/0068 323/268 |
| 2019/0280510 A1 * | 9/2019 | Sato | ................. | H02J 7/007184 |
| 2020/0366113 A1 * | 11/2020 | Inai | ......................... | H04N 23/65 |
| 2022/0103006 A1 * | 3/2022 | Inai | ......................... | G06F 1/263 |
| 2022/0311059 A1 * | 9/2022 | Patel | .................... | H02J 7/0045 |

FOREIGN PATENT DOCUMENTS

| | | |
|---|---|---|
| JP | 2001235789 A | 8/2001 |
| JP | 2019185739 A | 10/2019 |
| JP | 2020141510 A | 9/2020 |

* cited by examiner

*Primary Examiner* — Raymond N Phan
(74) *Attorney, Agent, or Firm* — Cowan, Liebowitz & Latman, P.C.

(57) ABSTRACT

An electronic apparatus comprises a connection unit and a conversion unit configured to convert an input voltage into an output voltage that is 1/N times the input voltage. A control unit requests a power supplying apparatus for a third voltage that is N times a first voltage. In a case where an external apparatus is connected to the connection unit after the request for the third voltage, the control unit requests the power supplying apparatus to supply a fourth voltage that is N times a second voltage in response to receiving, from the external apparatus, an instruction for setting the second voltage as a voltage to be output from the electronic apparatus to the external apparatus. The second voltage is higher than the first voltage.

14 Claims, 6 Drawing Sheets

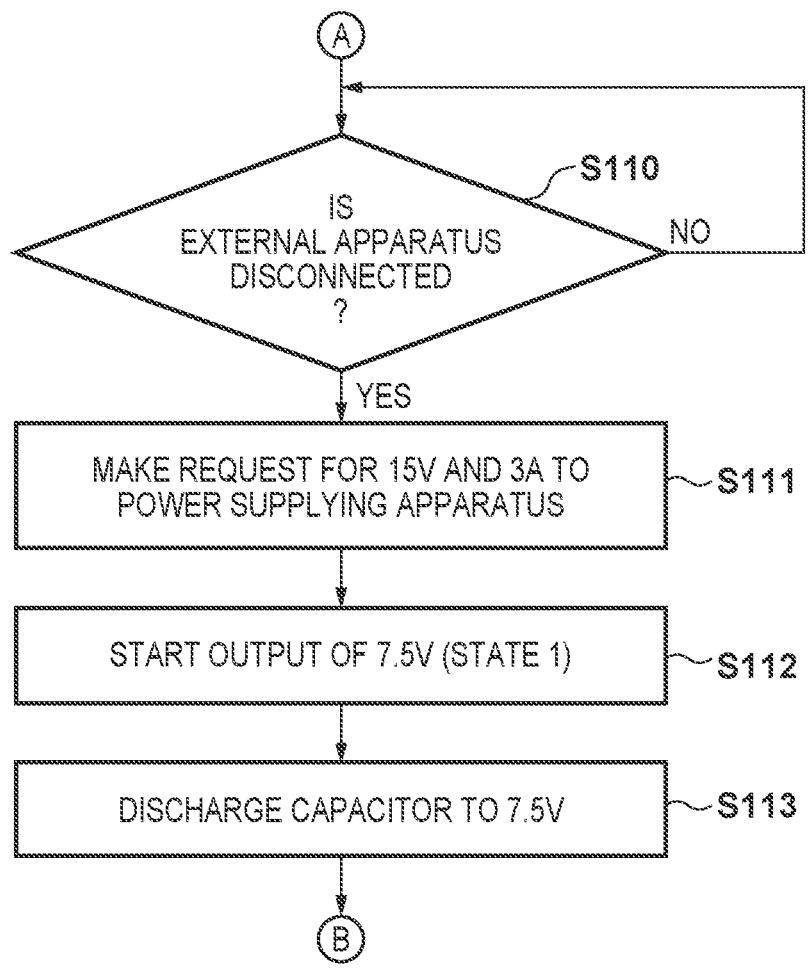

ELECTRONIC APPARATUS, CONTROL METHOD, AND STORAGE MEDIUM

BACKGROUND OF THE INVENTION

Field of the Invention

The present invention relates to an electronic apparatus, a control method, and a storage medium.

Description of the Related Art

Such electronic apparatuses as cameras are generally configured to use a removable battery as a power source. A DC coupler that supplies power to a camera has been known. A DC coupler has the same shape as a battery, and supplies power that is supplied from an external power source such as an AC adapter to a camera. Japanese Patent Laid-Open No. 2001-235789 discloses a configuration that supplies power to a camera using a DC coupler.

Also, in recent years, power supplying apparatuses that conform with the USB Power Delivery (USB PD) standard have emerged. An electronic apparatus that receives power from a power supplying apparatus that conforms with the USB PD standard can request the power supplying apparatus for required power by designating a power profile in accordance with the standard. For example, in a case where the electronic apparatus requires 45 W, the electronic apparatus can request the power supplying apparatus for 15 V and 3 A, whereas in a case where the electronic apparatus requires 60 W, the electronic apparatus can request the power supplying apparatus for 20 V and 3 A. Japanese Patent Laid-Open No. 2019-185739 discloses an electronic apparatus that receives power from a power supplying apparatus that conforms with the USB PD standard, such as an AC adapter.

Furthermore, a DC-DC converter based on a switched capacitor method has been known as a voltage conversion circuit for an electronic apparatus. A switched capacitor has an excellent conversion efficiency, and can suppress heat generation inside an electronic apparatus. Meanwhile, an output voltage of the switched capacitor is fixed at, for example, ½ of an input voltage. Therefore, when the switched capacitor is used, it is not possible to adjust the output voltage to an arbitrary voltage relative to the input voltage. Japanese Patent Laid-Open No. 2020-141510 discloses a configuration of a power source circuit that uses a switched capacitor.

In electronic apparatuses such as cameras, a supported voltage varies depending on the model thereof. However, as stated earlier, a DC-DC converter based on a switched capacitor method cannot adjust an output voltage to an arbitrary voltage relative to an input voltage. Therefore, in a case where an electronic apparatus like a DC coupler that includes a DC-DC converter based on a switched capacitor method is used, there is a possibility that an inappropriate voltage (an excessively high voltage or an excessively low voltage) is supplied to an external electronic apparatus such as a camera depending on an input voltage from a power supplying apparatus.

SUMMARY OF THE INVENTION

The present invention has been made in view of the foregoing situation. The present invention provides a technique to increase the possibility of an electronic apparatus that lowers an input voltage from a power supplying apparatus at a predetermined rate to supply, to an external apparatus, an appropriate voltage based on a voltage supported by the external apparatus. According to a first aspect of the present invention, there is provided an electronic apparatus comprising at least one processor and/or at least one circuit which function as: a connection unit configured to be connected to an external apparatus; a conversion unit configured to convert an input voltage supplied from a power supplying apparatus into an output voltage that is 1/N times the input voltage, 1/N being predetermined (where N>1), and the output voltage from the conversion unit being output from the connection unit to the external apparatus in a case where the external apparatus has been connected to the connection unit; and a control unit configured to request the power supplying apparatus for a third voltage that is N times a first voltage, wherein in a case where the third voltage has been supplied from the power supplying apparatus in response to the request for the third voltage, the conversion unit converts the third voltage into the first voltage, and the first voltage is output from the connection unit, and in a case where the external apparatus is connected to the connection unit after the control unit has requested the power supplying apparatus to supply the third voltage, the control unit performs communication with the external apparatus, and requests the power supplying apparatus to supply a fourth voltage that is N times a second voltage in response to receiving, from the external apparatus via the communication, an instruction for setting the second voltage as a voltage to be output from the electronic apparatus to the external apparatus, the second voltage being higher than the first voltage.

According to a second aspect of the present invention, there is provided a control method executed by an electronic apparatus comprising at least one processor and/or at least one circuit which function as: a connection unit configured to be connected to an external apparatus; and a conversion unit configured to convert an input voltage supplied from a power supplying apparatus into an output voltage that is 1/N times the input voltage, 1/N being predetermined (where N>1), and the output voltage from the conversion unit being output from the connection unit to the external apparatus in a case where the external apparatus has been connected to the connection unit, the control method comprising: requesting the power supplying apparatus for a third voltage that is N times a first voltage, wherein in a case where the third voltage has been supplied from the power supplying apparatus in response to the request for the third voltage, the conversion unit converts the third voltage into the first voltage, and the first voltage is output from the connection unit; and in a case where the external apparatus is connected to the connection unit after requesting the power supplying apparatus to supply the third voltage, performing communication with the external apparatus, and requesting the power supplying apparatus to supply a fourth voltage that is N times a second voltage in response to receiving, from the external apparatus via the communication, an instruction for setting the second voltage as a voltage to be output from the electronic apparatus to the external apparatus, the second voltage being higher than the first voltage.

According to a third aspect of the present invention, there is provided a non-transitory computer-readable storage medium which stores a program for causing an electronic apparatus to execute a control method, the electronic apparatus comprising at least one processor and/or at least one circuit which function as: a connection unit configured to be connected to an external apparatus; and a conversion unit configured to convert an input voltage supplied from a power supplying apparatus into an output voltage that is 1/N times the input voltage, 1/N being predetermined (where N>1), and the output voltage from the conversion unit being output from the connection unit to the external apparatus in a case where the external apparatus has been connected to the connection unit, the control method comprising: requesting the power supplying apparatus for a third voltage that is N times a first voltage, wherein in a case where the third voltage has been supplied from the power supplying apparatus in response to the request for the third voltage, the conversion unit converts the third voltage into the first voltage, and the first voltage is output from the connection unit; and in a case where the external apparatus is connected to the connection unit after requesting the power supplying apparatus to supply the third voltage, performing communication with the external apparatus, and requesting the power supplying apparatus to supply a fourth voltage that is N times a second voltage in response to receiving, from the external apparatus via the communication, an instruction for setting the second voltage as a voltage to be output from the electronic apparatus to the external apparatus, the second voltage being higher than the first voltage.

According to a fourth aspect of the present invention, there is provided an electronic apparatus comprising at least one processor and/or at least one circuit which function as: a connection unit configured to be connected to an external apparatus; a conversion unit configured to convert an input voltage supplied from a power supplying apparatus into an output voltage that is 1/N times the input voltage (where N>1), 1/N being predetermined, and the output voltage from the conversion unit being output from the connection unit to the external apparatus in a case where the external apparatus has been connected to the connection unit; and a control unit configured to request the power supplying apparatus for a third voltage that is N times a first voltage, wherein in a case where the third voltage has been supplied as the input voltage from the power supplying apparatus in response to the request for the third voltage, the conversion unit converts the third voltage into the first voltage, and the first voltage is output from the connection unit, and in a case where the external apparatus is connected to the connection unit after the control unit has requested the power supplying apparatus to supply the third voltage, the control unit determines whether the external apparatus supports a second voltage higher than the first voltage, and requests the power supplying apparatus to supply a fourth voltage that is N times the second voltage in a case where it has been determined that the external apparatus supports the second voltage.

According to a fifth aspect of the present invention, there is provided a control method executed by an electronic apparatus comprising at least one processor and/or at least one circuit which function as: a connection unit configured to be connected to an external apparatus; and a conversion unit configured to convert an input voltage supplied from a power supplying apparatus into an output voltage that is 1/N times the input voltage (where N>1), 1/N being predetermined, and the output voltage from the conversion unit being output from the connection unit to the external apparatus in a case where the external apparatus has been connected to the connection unit, the control method comprising: requesting the power supplying apparatus for a third voltage that is N times a first voltage, wherein in a case where the third voltage has been supplied as the input voltage from the power supplying apparatus in response to the request for the third voltage, the conversion unit converts the third voltage into the first voltage, and the first voltage is output from the connection unit; and in a case where the external apparatus is connected to the connection unit after requesting the power supplying apparatus to supply the third voltage, determining whether the external apparatus supports a second voltage higher than the first voltage, and requesting the power supplying apparatus to supply a fourth voltage that is N times the second voltage in a case where it has been determined that the external apparatus supports the second voltage.

According to a sixth aspect of the present invention, there is provided a non-transitory computer-readable storage medium which stores a program for causing an electronic apparatus to execute a control method, the electronic apparatus comprising at least one processor and/or at least one circuit which function as: a connection unit configured to be connected to an external apparatus; and a conversion unit configured to convert an input voltage supplied from a power supplying apparatus into an output voltage that is 1/N times the input voltage (where N>1), 1/N being predetermined, and the output voltage from the conversion unit being output from the connection unit to the external apparatus in a case where the external apparatus has been connected to the connection unit, the control method comprising: requesting the power supplying apparatus for a third voltage that is N times a first voltage, wherein in a case where the third voltage has been supplied as the input voltage from the power supplying apparatus in response to the request for the third voltage, the conversion unit converts the third voltage into the first voltage, and the first voltage is output from the connection unit; and in a case where the external apparatus is connected to the connection unit after requesting the power supplying apparatus to supply the third voltage, determining whether the external apparatus supports a second voltage higher than the first voltage, and requesting the power supplying apparatus to supply a fourth voltage that is N times the second voltage in a case where it has been determined that the external apparatus supports the second voltage.

Further features of the present invention will become apparent from the following description of exemplary embodiments with reference to the attached drawings.

BRIEF DESCRIPTION OF THE DRAWINGS

FIG. 3B is a flowchart for describing the operations of the electronic apparatus 100.

DESCRIPTION OF THE EMBODIMENTS

Figure 1:
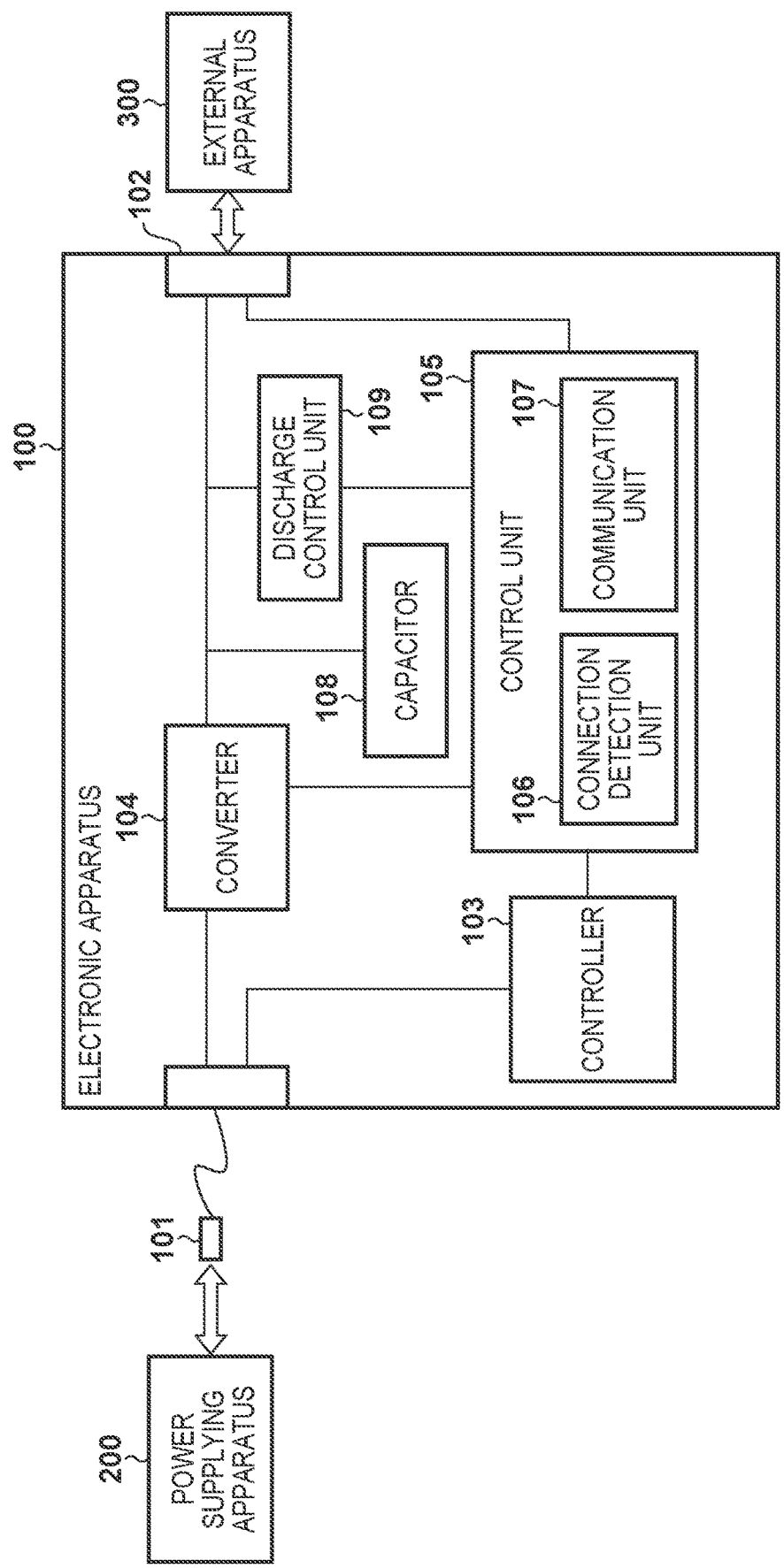
FIG. 1 is a block diagram showing a configuration of an electronic apparatus 100.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate.

Furthermore, in the attached drawings, the same reference numerals are given to the same or similar configurations, and redundant description thereof is omitted.

First Embodiment

FIG. 1 is a block diagram showing a configuration of an electronic apparatus 100. The electronic apparatus 100 has functions of a power receiving apparatus that conform with USB Power Delivery (USB PD), and is connected to a power supplying apparatus 200 via a connector 101. The power supplying apparatus 200 is a power supplying apparatus that conforms with USB PD. The connector 101 is a connector that conforms with USB Type-C. A connection unit 102 connects to an external apparatus 300. The electronic apparatus 100 receives voltage from the power supplying apparatus 200, converts the received voltage, and outputs the converted voltage to the external apparatus 300 connected to the connection unit 102. A controller 103 performs communication with the power supplying apparatus connected to the connector 101 in conformity with the USB PD standard. The controller 103 requests the power supplying apparatus 200 for a power profile desired by the electronic apparatus 100.

A converter 104 is a DC-DC converter that converts an input voltage supplied from the power supplying apparatus 200 into an output voltage that is 1/N times the input voltage, 1/N being predetermined (where N>1). Any configuration can be used as a specific configuration of the converter 104, as long as it converts an input voltage into an output voltage that is 1/N times the input voltage, 1/N being predetermined (where N>1) (in other words, lowers the input voltage at a predetermined rate). As one example, the converter 104 is a DC-DC converter based on a switched capacitor method, in which case N is an integer equal to or larger than two. In the following description, it is assumed that the converter 104 is a DC-DC converter based on a switched capacitor method that converts an input voltage supplied from the power supplying apparatus 200 into an output voltage that is ½ of the input voltage.

A control unit 105 includes a memory (not shown) storing a control program, and controls each constituent element of the electronic apparatus 100 by executing the control program. Also, the control unit 105 includes a connection detection unit 106 and a communication unit 107. The connection detection unit 106 detects (determines) whether the external apparatus 300 is connected to the connection unit 102. The communication unit 107 performs communication with the external apparatus 300 connected to the connection unit 102, and receives information related to the external apparatus 300. A capacitor 108 is connected to the output side of the converter 104 in parallel with the connection unit 102, and receives the output voltage from the converter 104. A discharge control unit 109 discharges the charges of the capacitor 108 under control of the control unit 105.

Figure 2:
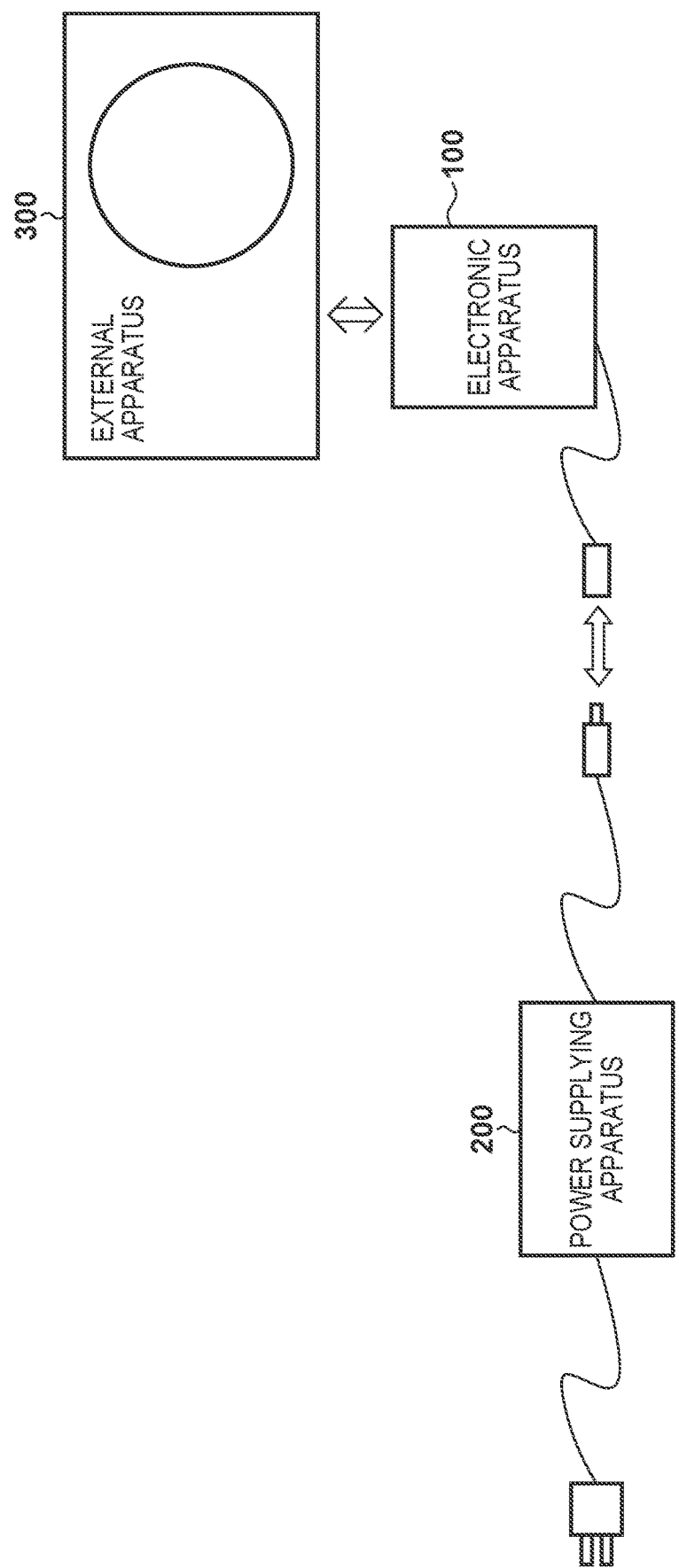
FIG. 2 is a block diagram showing a configuration of a system.

FIG. 2 is a block diagram showing a configuration of a system according to the present embodiment. The electronic apparatus 100 is connected to the power supplying apparatus 200, and receives power (voltage and current) supplied from the power supplying apparatus 200. The electronic apparatus 100 converts the voltage of the power received from the power supplying apparatus 200, and supplies the converted voltage to the external apparatus 300. The power supplying apparatus 200 conforms with the USB PD standard. The power supplying apparatus 200 may be, for example, an AC adapter, a power bank, an output port of a PC, a power source port housed in a wall surface, or the like.

The external apparatus 300 is, for example, an electronic apparatus such as a camera. The external apparatus 300 can operate while using a removable battery as a power source. Also, the external apparatus 300 includes a case (battery case) that allows the battery to be mounted therein. The electronic apparatus 100 has a shape that allows itself to be mounted in this battery case. The electronic apparatus 100 can be mounted in the battery case of the external apparatus 300 in place of the battery. In this case, the electronic apparatus 100 functions as a DC coupler for the external apparatus 300. The DC coupler is used as a power source of the external apparatus 300.

Figure 3A:
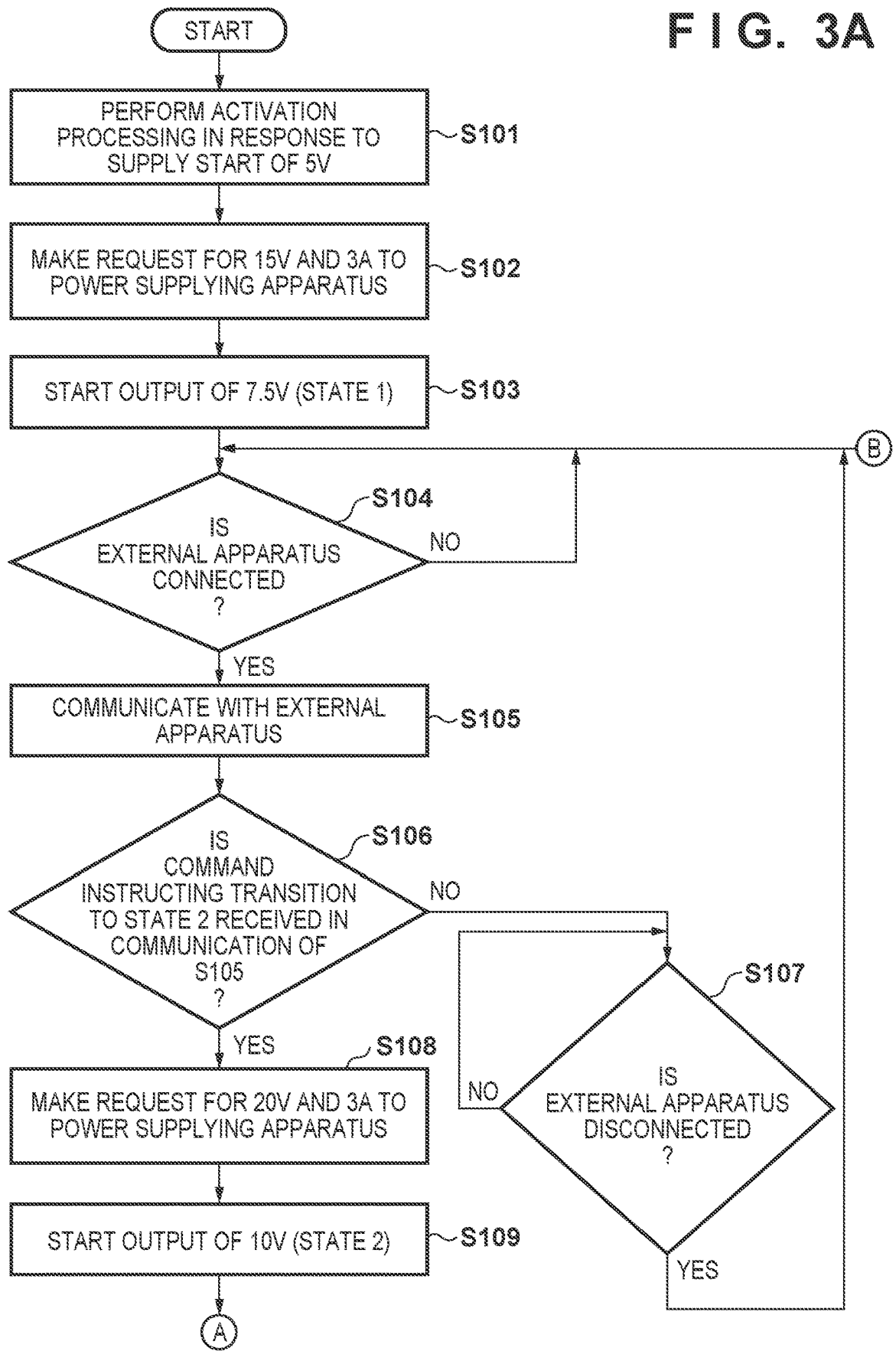
FIG. 3A is a flowchart for describing the operations of the electronic apparatus 100.

FIG. 3A and FIG. 3B are flowcharts for describing the operations of the electronic apparatus 100. Processing of each step of the present flowcharts is realized by the control unit 105 executing the control program, unless specifically stated otherwise. Processing of the present flowcharts is started upon connection of the power supplying apparatus 200 to the connector 101.

In step S101, a supply of 5 V power from the power supplying apparatus 200 to the electronic apparatus 100 is started via the connector 101. In response to the start of the power supply, the control unit 105 executes activation processing for the electronic apparatus 100.

In step S102, the control unit 105 controls the controller 103 to perform communication with the power supplying apparatus 200 based on USB PD and receives information on the power supply capability from the power supplying apparatus 200. Based on the information on the power supply capability, the control unit 105 determines power (hereinafter referred to as a "power profile") for which the power supplying apparatus 200 is requested among a plurality of patterns of power (combinations of voltage and current) that can be supplied from the power supplying apparatus 200. Then, the control unit 105 transmits the requested power profile to the power supplying apparatus 200 by controlling the controller 103. It is assumed here that the power supplying apparatus 200 is requested for 15 V and 3 A. The power supplying apparatus 200 supplies the requested voltage and current in accordance with the power profile requested by the electronic apparatus 100. The power of 15 V and 3 A supplied from the power supplying apparatus 200 is input to the converter 104 via the connector 101.

In step S103, the converter 104 converts the input voltage supplied from the power supplying apparatus 200. As stated earlier, the converter 104 converts the input voltage into an output voltage that is ½ of the input voltage; therefore, here, the input voltage of 15 V is converted into an output voltage of 7.5 V. Consequently, an output of 7.5 V is started. Furthermore, along with the voltage conversion, the current that can be supplied from the converter 104 changes from 3 A to 6 A. The converter 104 supplies the converted power of 7.5 V to the connection unit 102. Hereinafter, a state where the power supplying apparatus 200 supplies 15 V as the input voltage so that the converter 104 outputs 7.5 V as the output voltage will be referred to as state 1.

In step S104, the connection detection unit 106 determines whether the external apparatus 300 has been connected to the connection unit 102. The connection detection unit 106 repeats the determination of step S104 until the external apparatus 300 is connected to the connection unit 102. When the external apparatus 300 has been connected to the connection unit 102, processing proceeds to step S105. Once the external apparatus 300 has been connected to the connection unit 102, the power of 7.5 V (the output voltage in state 1) and 6 A is supplied to the external apparatus 300 via the connection unit 102. The external apparatus 300 is activated upon receiving the power supply from the connection unit 102. Once the external apparatus 300 has been activated, the external apparatus 300 can communicate with the electronic apparatus 100.

In step S105, the communication unit 107 performs communication with the external apparatus 300 via the connection unit 102.

In the present embodiment, an apparatus that supports the output voltage in state 1 and an apparatus that supports a voltage higher than the output voltage in state 1 can be connected as the external apparatus 300. A state where the converter 104 outputs a voltage higher than that in state 1 is regarded as state 2. In the following description, it is assumed that the output voltage is 10 V and the input voltage is 20 V in state 2.

In the communication performed here, the communication unit 107 transmits pieces of information related to its own type (pieces of information indicating a model name and a group) to the external apparatus 300. The external apparatus 300 receives these pieces of information transmitted from the electronic apparatus 100.

In a case where the external apparatus 300 is an apparatus that supports the voltage in state 2, the external apparatus 300 detects a type (bits indicating a model name and a group) of the electronic apparatus 100 based on the pieces of information received from the electronic apparatus 100. The external apparatus 300 that supports the voltage in state 2 holds information related to the conditions corresponding to the type of the electronic apparatus 100, and determines whether the electronic apparatus 100 can supply the voltage corresponding to state 2 in accordance with such conditions. Once the external apparatus 300 that supports the voltage in state 2 has determined that the electronic apparatus 100 can supply the voltage corresponding to state 2, the external apparatus 300 transmits a command representing an instruction for transition to state 2 to the electronic apparatus 100.

Also, in a case where the external apparatus 300 is not an apparatus that supports the voltage in state 2, the external apparatus 300 does not transmit the command representing the instruction for transition to state 2 even if it has received the pieces of information from the electronic apparatus 100.

Note that the external apparatus 300 may transmit the command representing the instruction for transition to state 2 to the electronic apparatus 100 regardless of whether the electronic apparatus 100 can supply the voltage corresponding to state 2. In this case, the communication unit 107 may not transmit the pieces of information related to its own type (pieces of information indicating a model name and a group) to the external apparatus 300. In a case where an electronic apparatus that cannot supply the voltage corresponding to state 2 has received the command, it is sufficient for the electronic apparatus to ignore the command.

In step S106, the control unit 105 determines whether the command representing the instruction for transition to state 2 has been received from the external apparatus 300 in the communication of step S105. In a case where the command representing the instruction for transition to state 2 has not been received, processing proceeds to step S107; in a case where the command representing the instruction for transition to state 2 has been received, processing proceeds to step S108.

In step S107, the connection detection unit 106 determines whether the external apparatus 300 has been disconnected from the connection unit 102. The connection detection unit 106 repeats the determination of step S107 until the external apparatus 300 is disconnected from the connection unit 102. When the external apparatus 300 has been disconnected from the connection unit 102, processing returns to step S104. Therefore, in a case where the external apparatus 300 does not support the output voltage in state 2 and the command representing the instruction for transition to state 2 has not been received from the external apparatus 300, the electronic apparatus 100 continues the supply of the voltage in state 1 (i.e., the supply of the voltage of 7.5 V) to the external apparatus 300.

In step S108, the control unit 105 controls the controller 103 to request the power supplying apparatus 200 for a profile of 20 V and 3 A. In accordance with this request, the power supplying apparatus 200 supplies 20 V and 3 A. The power of 20 V and 3 A supplied from the power supplying apparatus 200 is input to the converter 104 via the connector 101.

In step S109, the converter 104 converts the input voltage supplied from the power supplying apparatus 200. As stated earlier, the converter 104 converts the input voltage into an output voltage that is ½ of the input voltage; therefore, here, the input voltage of 20 V is converted into an output voltage of 10 V. Consequently, an output of 10 Vis started. Furthermore, along with the voltage conversion, the current that can be output from the converter 104 changes from 3 A to 6 A. The converter 104 supplies the converted power of 10 V and 6 A to the connection unit 102. Therefore, in a case where the external apparatus 300 supports the output voltage in state 2, the electronic apparatus 100 makes a transition from state 1 to state 2.

As stated earlier, the output voltage in state 2 is higher than the output voltage in state 1. Therefore, according to the present embodiment, in a case where the electronic apparatus 100 does not receive a command representing an instruction for transition to a relatively high output voltage (state 2) from the external apparatus 300, control for supplying a relatively low output voltage (state 1) to the external apparatus 300 is performed. Furthermore, when the electronic apparatus 100 has received a command representing an instruction for transition to a relatively high output voltage (state 2) from the external apparatus 300, control for supplying the relatively high output voltage (state 2) supported by the external apparatus 300 to the external apparatus 300 is performed. Performing such control increases the possibility of the electronic apparatus 100 to supply an appropriate voltage based on a voltage supported by the external apparatus 300.

Note that a specific magnitude of the output voltage in state 1 is not limited in particular; as one example, the output voltage in state 1 is a voltage supported by many (or all) of the external apparatuses that are expected to be connected to the electronic apparatus 100. In this case, when the external apparatus 300 has been connected to the electronic apparatus 100, the possibility that a voltage exceeding a voltage supported by the external apparatus 300 is supplied to the external apparatus 300 is further reduced. Therefore, the possibility of the electronic apparatus 100 to supply an appropriate voltage based on a voltage supported by the external apparatus 300 can be further increased.

In step S110, the connection detection unit 106 determines whether the external apparatus 300 has been disconnected from the connection unit 102. The connection detection unit 106 repeats the determination of step S110 until the external apparatus 300 is disconnected from the connection unit 102. When the external apparatus 300 has been disconnected from the connection unit 102, processing proceeds to step S111.

In step S111, the control unit 105 controls the controller 103 to request the power supplying apparatus 200 for a supply of 15 V and 3 A. In accordance with this request, the power supplying apparatus 200 supplies 15 V and 3 A. The power of 15 V and 3 A supplied from the power supplying apparatus 200 is input to the converter 104 via the connector 101.

In step S112, the converter 104 converts the input voltage supplied from the power supplying apparatus 200. As stated earlier, the converter 104 converts the input voltage into an output voltage that is ½ of the input voltage; therefore, here, the input voltage of 15 V is converted into an output voltage of 7.5 V. Consequently, the electronic apparatus 100 makes a transition from state 2 to state 1, and an output of 7.5 V is started. Furthermore, along with the voltage conversion, the current that can be output from the converter 104 changes from 3 A to 6 A.

As a result of processing of step S112, the output voltage from the converter 104 changes from 10 V to 7.5 V. However, as the capacitor 108 is connected to an output path of the converter 104, it takes time for the voltage of the connection unit 102 to drop to 7.5 V. For this reason, in step S113, the control unit 105 performs control to shorten the time period until the voltage of the connection unit 102 drops to 7.5 V. Specifically, the control unit 105 controls the discharge control unit 109 to discharge the charges of the capacitor 108, thereby shortening the time period until the voltage of the connection unit 102 drops to 7.5 V. Thereafter, processing returns to step S104.

Figure 4:
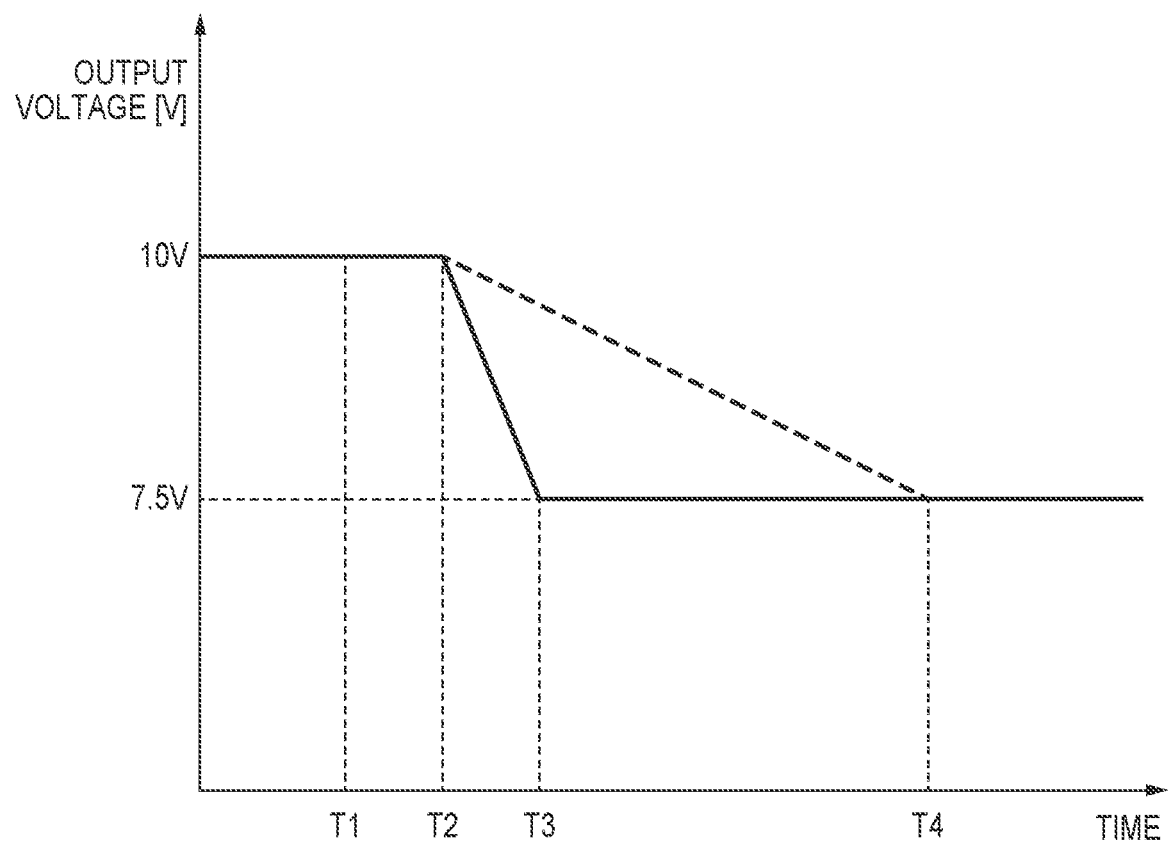
FIG. 4 is a timing chart of an output voltage of a connection unit 102.

FIG. 4 is a timing chart of an output voltage of the connection unit 102. At time T1, the electronic apparatus 100 is operating in state 2 in which the converter 104 outputs 10 V and 6 A. At time T2, the external apparatus 300 is disconnected from the connection unit 102, and the electronic apparatus 100 makes a transition to state 1 in which the converter 104 outputs 7.5 V and 6 A (steps S110 to S112). At this time, the connection unit 102 is placed in a state where no load is connected thereto; therefore, if processing of step S113 is not executed, a time period until T4 is required for the charges of the capacitor 108 to be discharged and the voltage to drop to 7.5 V. Conversely, in a case where the discharge control unit 109 has performed control to discharge the charges of the capacitor 108 in step S113, the voltage drops to 7.5 V at time T3, which is earlier than time T4. Therefore, the time period until the voltage of the connection unit 102 drops to 7.5 V is shortened.

As described above, according to the first embodiment, the electronic apparatus 100 includes the converter 104 that converts an input voltage supplied from the power supplying apparatus 200 into an output voltage that is 1/N times the input voltage, 1/N being predetermined (where N>1). As stated earlier, the converter 104 is, for example, a DC-DC converter based on a switched capacitor method that converts an input voltage into an output voltage that is ½ of the input voltage. Furthermore, the electronic apparatus 100 includes the connection unit 102, and once an external apparatus has been connected to the connection unit 102, the connection unit 102 supplies an output voltage of the converter 104 to the external apparatus.

The electronic apparatus 100 requests the power supplying apparatus 200 to supply a third voltage (e.g., 15 V) that is N times (e.g., twice) a first voltage (e.g., 7.5 V). Thereafter, when the external apparatus has been connected to the connection unit 102, the electronic apparatus 100 performs communication with the external apparatus 300. In a case where the external apparatus 300 supports a second voltage (e.g., 10V) higher than the first voltage (e.g., 7.5 V), the external apparatus 300 transmits a command representing an instruction for transition to state 2. In a case where the electronic apparatus 100 has received the command representing the instruction for transition to state 2 corresponding to the second voltage (e.g., 10 V) from the external apparatus 300, it requests the power supplying apparatus 200 to supply a fourth voltage (e.g., 20 V) that is N times (e.g., twice) the second voltage (e.g., 10 V).

Therefore, the present embodiment can increase the possibility of the electronic apparatus 100 to supply, to the external apparatus 300, an appropriate voltage based on a voltage supported by the external apparatus.

Note that in the foregoing description, it is assumed that the exchange of power between the electronic apparatus 100 and the power supplying apparatus 200 is carried out in accordance with the USB PD standard. However, the present embodiment is not limited to the USB PD standard. Any configuration can be used in relation to the exchange of power between the electronic apparatus 100 and the power supplying apparatus 200, as long as it is a configuration that allows the power supplying apparatus 200 to supply a voltage requested by the electronic apparatus 100 to the electronic apparatus 100. In this respect, the same goes for a second embodiment, which will be described later.

Second Embodiment

The first embodiment has been described in relation to a configuration that performs control so that the electronic apparatus 100 makes a transition from state 1 to state 2 in a case where it has received a command representing an instruction for transition to state 2 from the external apparatus 300. A second embodiment will be described in relation to a configuration that performs control so that the electronic apparatus 100 determines whether the external apparatus 300 supports state 2, and makes a transition from state 1 to state 2 in a case where it has been determined that the external apparatus 300 supports state 2.

In the second embodiment, the basic configurations of the electronic apparatus 100, power supplying apparatus 200, and external apparatus 300 are similar to those of the first embodiment. The following mainly describes the differences from the first embodiment.

Figure 5:
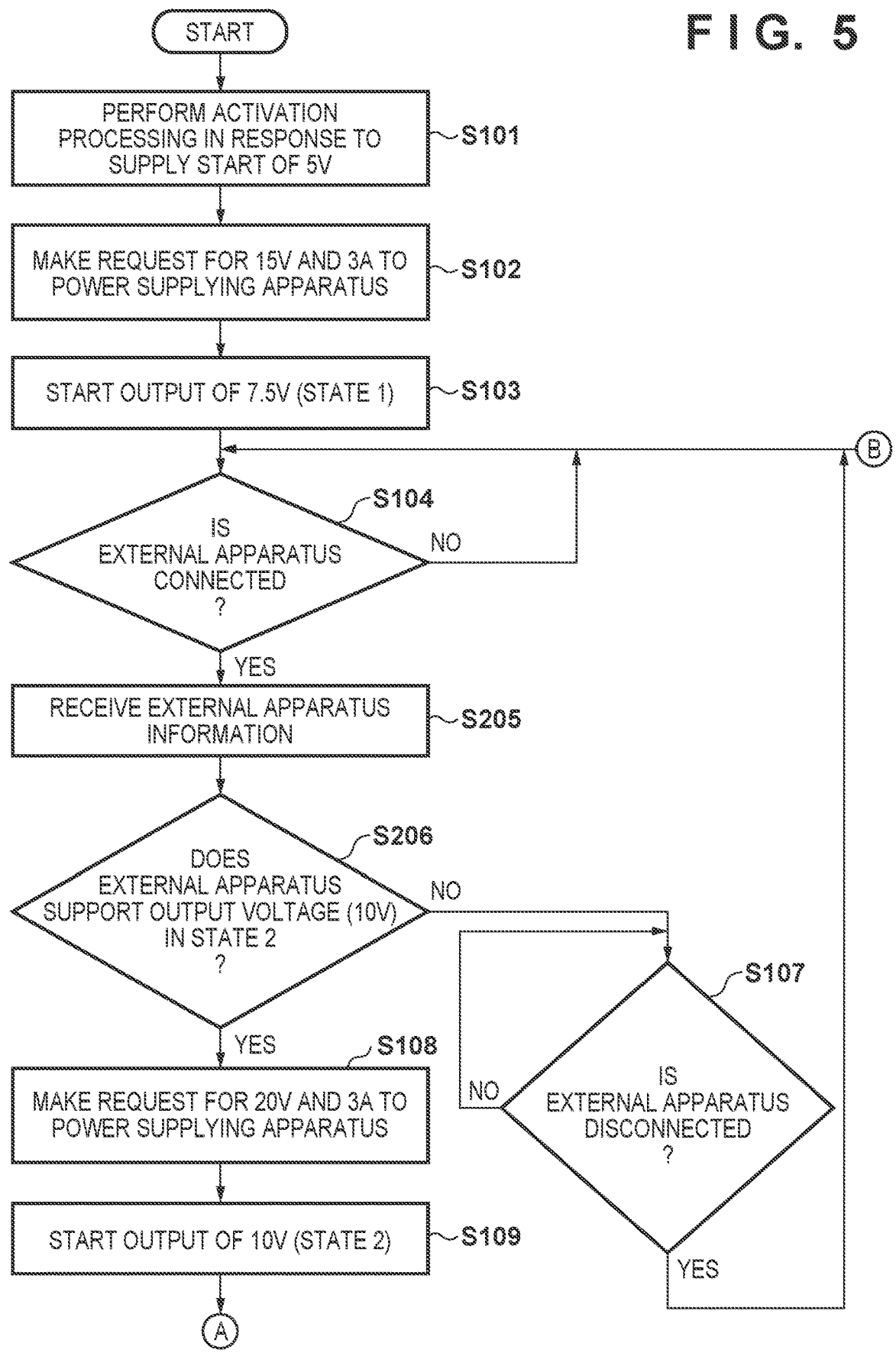
FIG. 5 is a flowchart for describing the operations of the electronic apparatus 100 according to a second embodiment.

FIG. 5 is a flowchart for describing the operations of the electronic apparatus 100 according to the second embodiment. In the present embodiment, step S109 of FIG. 5 follows step S110 of FIG. 3B, and step S113 of FIG. 3B follows step S104 of FIG. 5.

In step S205, the communication unit 107 performs communication with the external apparatus 300 via the connection unit 102. Then, the communication unit 107 receives information related to the external apparatus 300 (external apparatus information) via the communication with the external apparatus 300.

The external apparatus information is information that can be used to determine whether the external apparatus 300 supports an output voltage in state 2. Similarly to the first embodiment, state 2 denotes a state where the power supplying apparatus supplies an input voltage so that the converter 104 outputs a voltage higher than an output voltage in state 1 as the output voltage. In the following description, it is assumed that the output voltage and the input voltage in state 2 are 10 V and 20 V, respectively.

Although a specific structure of the external apparatus information is not limited in particular, the external apparatus information may be, for example, information indicating the maximum voltage supported by the external apparatus 300. As another example, the external apparatus information may be a model name or a model group of the external apparatus 300. In this case, the electronic apparatus 100 can identify the maximum voltage supported by the external apparatus 300 by referring to information in which model names or model groups are associated with maximum voltages. The information in which model names or model groups are associated with maximum voltages is, for example, information in a format of a table that includes a plurality of combinations of a model name or a model group and a maximum voltage, and this information is held in a nonvolatile memory (not shown) of the electronic apparatus 100 in advance.

In step S206, the control unit 105 determines whether the external apparatus 300 supports the output voltage in state 2 based on the external apparatus information obtained in step S205. In a case where the external apparatus 300 does not support the output voltage in state 2, processing proceeds to step S107. Therefore, in a case where the external apparatus 300 does not support the output voltage in state 2, the electronic apparatus 100 continues the supply of the voltage in state 1 (i.e., the supply of the voltage of 7.5 V) to the external apparatus 300.

In a case where it has been determined in step S206 that the external apparatus 300 supports the output voltage in state 2, processing proceeds to step S108. Therefore, until it is confirmed that the external apparatus 300 supports a relatively high output voltage (state 2), control for supplying a relatively low output voltage (state 1) to the external apparatus 300 is performed. Then, when it has been confirmed that the external apparatus 300 supports the relatively high output voltage (state 2), control for supplying the relatively high output voltage (state 2) supported by the external apparatus 300 to the external apparatus 300 is performed. Performing such control increases the possibility of the electronic apparatus 100 to supply an appropriate voltage based on a voltage supported by the external apparatus 300.

As described above, according to the second embodiment, the electronic apparatus 100 includes the converter 104 that converts an input voltage supplied from the power supplying apparatus 200 into an output voltage that is 1/N times the input voltage, 1/N being predetermined (where N>1). As stated earlier, the converter 104 is, for example, a DC-DC converter based on a switched capacitor method that converts an input voltage into an output voltage that is ½ of the input voltage. Furthermore, the electronic apparatus 100 includes the connection unit 102, and once an external apparatus has been connected to the connection unit 102, the connection unit 102 supplies an output voltage of the converter 104 to the external apparatus.

The electronic apparatus 100 requests the power supplying apparatus 200 to supply a third voltage (e.g., 15 V) that is N times (e.g., twice) a first voltage (e.g., 7.5 V). Thereafter, when the external apparatus has been connected to the connection unit 102, the electronic apparatus 100 determines whether the external apparatus 300 supports a second voltage (e.g., 10 V) higher than the first voltage (e.g., 7.5 V). In a case where it has been determined that the external apparatus 300 supports the second voltage (e.g., 10 V), the electronic apparatus 100 requests the power supplying apparatus 200 to supply a fourth voltage (e.g., 20 V) that is N times (e.g., twice) the second voltage (e.g., 10 V).

Therefore, the present embodiment can increase the possibility of the electronic apparatus 100 to supply, to the external apparatus 300, an appropriate voltage based on a voltage supported by the external apparatus.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-065898, filed Apr. 13, 2023, which is hereby incorporated by reference herein in its entirety.

What is claimed is:

1. An electronic apparatus comprising at least one processor and/or at least one circuit which function as:

a connection unit configured to be connected to an external apparatus;

a conversion unit configured to convert an input voltage supplied from a power supplying apparatus into an output voltage that is 1/N times the input voltage, 1/N being predetermined (where N>1), and the output voltage from the conversion unit being output from the connection unit to the external apparatus in a case where the external apparatus has been connected to the connection unit; and a control unit configured to request the power supplying apparatus for a third voltage that is N times a first voltage, wherein in a case where the third voltage has been supplied from the power supplying apparatus in response to the request for the third voltage, the conversion unit converts the third voltage into the first voltage, and the first voltage is output from the connection unit, and in a case where the external apparatus is connected to the connection unit after the control unit has requested the power supplying apparatus to supply the third voltage, the control unit performs communication with the external apparatus, and requests the power supplying apparatus to supply a fourth voltage that is N times a second voltage in response to receiving, from the external apparatus via the communication, an instruction for setting the second voltage as a voltage to be output from the electronic apparatus to the external apparatus, the second voltage being higher than the first voltage.

2. The electronic apparatus according to claim 1, wherein
in a case where the third voltage has been supplied from the power supplying apparatus and the external apparatus has been connected to the connection unit, the first voltage is output from the connection unit to the external apparatus, and
in a case where the fourth voltage has been supplied from the power supplying apparatus in response to the request for the fourth voltage, the conversion unit converts the fourth voltage into the second voltage, and the second voltage, in place of the first voltage, is output from the connection unit to the external apparatus.

3. The electronic apparatus according to claim 1, wherein
in a case where the external apparatus has been disconnected from the connection unit while the input voltage supplied from the power supplying apparatus is the fourth voltage, the control unit requests the power supplying apparatus to supply the third voltage.

4. The electronic apparatus according to claim 1, wherein the conversion unit converts the input voltage into the output voltage using a switched capacitor.

5. The electronic apparatus according to claim 1, wherein the power supplying apparatus conforms with a USB Power Delivery (USB PD) standard.

6. The electronic apparatus according to claim 1, wherein in the communication, the control unit transmits information related to a type of the electronic apparatus to the external apparatus.

7. The electronic apparatus according to claim 1, wherein
in a case where the fourth voltage has been supplied as the input voltage from the power supplying apparatus in response to the request for the fourth voltage, the conversion unit converts the fourth voltage into the second voltage, and the connection unit outputs the second voltage to the external apparatus.

8. The electronic apparatus according to claim 1, wherein the electronic apparatus has a shape that allows the electronic apparatus to be mounted in a battery case of the external apparatus, and the electronic apparatus is mountable in the battery case in place of a battery for the external apparatus.

9. The electronic apparatus according to claim 3, wherein the at least one processor and/or at least one circuit further function as:
a capacitor configured to be connected to an output side of the conversion unit in parallel with the connection unit, and receive the output voltage of the conversion unit,
wherein in a case where the external apparatus has been disconnected from the connection unit while the input voltage supplied from the power supplying apparatus is the fourth voltage, the control unit performs control to discharge the capacitor until a voltage of the capacitor reaches the first voltage.

10. A control method executed by an electronic apparatus comprising at least one processor and/or at least one circuit which function as:
a connection unit configured to be connected to an external apparatus; and
a conversion unit configured to convert an input voltage supplied from a power supplying apparatus into an output voltage that is 1/N times the input voltage, 1/N being predetermined (where N>1), and the output voltage from the conversion unit being output from the connection unit to the external apparatus in a case where the external apparatus has been connected to the connection unit,
the control method comprising:
requesting the power supplying apparatus for a third voltage that is N times a first voltage, wherein in a case where the third voltage has been supplied from the power supplying apparatus in response to the request for the third voltage, the conversion unit converts the third voltage into the first voltage, and the first voltage is output from the connection unit; and
in a case where the external apparatus is connected to the connection unit after requesting the power supplying apparatus to supply the third voltage, performing communication with the external apparatus, and requesting the power supplying apparatus to supply a fourth voltage that is N times a second voltage in response to receiving, from the external apparatus via the communication, an instruction for setting the second voltage as a voltage to be output from the electronic apparatus to the external apparatus, the second voltage being higher than the first voltage.

11. A non-transitory computer-readable storage medium which stores a program for causing an electronic apparatus to execute a control method, the electronic apparatus comprising at least one processor and/or at least one circuit which function as:
a connection unit configured to be connected to an external apparatus; and
a conversion unit configured to convert an input voltage supplied from a power supplying apparatus into an output voltage that is 1/N times the input voltage, 1/N being predetermined (where N>1), and the output voltage from the conversion unit being output from the connection unit to the external apparatus in a case where the external apparatus has been connected to the connection unit,
the control method comprising:
requesting the power supplying apparatus for a third voltage that is N times a first voltage, wherein in a case where the third voltage has been supplied from the power supplying apparatus in response to the request for the third voltage, the conversion unit converts the third voltage into the first voltage, and the first voltage is output from the connection unit; and
in a case where the external apparatus is connected to the connection unit after requesting the power supplying apparatus to supply the third voltage, performing communication with the external apparatus, and requesting the power supplying apparatus to supply a fourth voltage that is N times a second voltage in response to receiving, from the external apparatus via the communication, an instruction for setting the second voltage as a voltage to be output from the electronic apparatus to the external apparatus, the second voltage being higher than the first voltage.

12. An electronic apparatus comprising at least one processor and/or at least one circuit which function as:
a connection unit configured to be connected to an external apparatus;
a conversion unit configured to convert an input voltage supplied from a power supplying apparatus into an output voltage that is 1/N times the input voltage (where N>1), 1/N being predetermined, and the output voltage from the conversion unit being output from the connection unit to the external apparatus in a case where the external apparatus has been connected to the connection unit; and a control unit configured to request the power supplying apparatus for a third voltage that is N times a first voltage, wherein in a case where the third voltage has been supplied as the input voltage from the power supplying apparatus in response to the request for the third voltage, the conversion unit converts the third voltage into the first voltage, and the first voltage is output from the connection unit, and in a case where the external apparatus is connected to the connection unit after the control unit has requested the power supplying apparatus to supply the third voltage, the control unit determines whether the external apparatus supports a second voltage higher than the first voltage, and requests the power supplying apparatus to supply a fourth voltage that is N times the second voltage in a case where it has been determined that the external apparatus supports the second voltage.

13. A control method executed by an electronic apparatus comprising at least one processor and/or at least one circuit which function as:

a connection unit configured to be connected to an external apparatus; and a conversion unit configured to convert an input voltage supplied from a power supplying apparatus into an output voltage that is 1/N times the input voltage (where N>1), 1/N being predetermined, and the output voltage from the conversion unit being output from the connection unit to the external apparatus in a case where the external apparatus has been connected to the connection unit, the control method comprising:

requesting the power supplying apparatus for a third voltage that is N times a first voltage, wherein in a case where the third voltage has been supplied as the input voltage from the power supplying apparatus in response to the request for the third voltage, the conversion unit converts the third voltage into the first voltage, and the first voltage is output from the connection unit; and in a case where the external apparatus is connected to the connection unit after requesting the power supplying apparatus to supply the third voltage, determining whether the external apparatus supports a second voltage higher than the first voltage, and requesting the power supplying apparatus to supply a fourth voltage that is N times the second voltage in a case where it has been determined that the external apparatus supports the second voltage.

14. A non-transitory computer-readable storage medium which stores a program for causing an electronic apparatus to execute a control method, the electronic apparatus comprising at least one processor and/or at least one circuit which function as:

a connection unit configured to be connected to an external apparatus; and a conversion unit configured to convert an input voltage supplied from a power supplying apparatus into an output voltage that is 1/N times the input voltage (where N>1), 1/N being predetermined, and the output voltage from the conversion unit being output from the connection unit to the external apparatus in a case where the external apparatus has been connected to the connection unit, the control method comprising:

requesting the power supplying apparatus for a third voltage that is N times a first voltage, wherein in a case where the third voltage has been supplied as the input voltage from the power supplying apparatus in response to the request for the third voltage, the conversion unit converts the third voltage into the first voltage, and the first voltage is output from the connection unit; and in a case where the external apparatus is connected to the connection unit after requesting the power supplying apparatus to supply the third voltage, determining whether the external apparatus supports a second voltage higher than the first voltage, and requesting the power supplying apparatus to supply a fourth voltage that is N times the second voltage in a case where it has been determined that the external apparatus supports the second voltage.

* * * * *